United States Patent Office 3,178,408
Patented Apr. 13, 1965

3,178,408
AMINOSTEROID COMPOUNDS AND PROCESS FOR THEIR MANUFACTURE
Leopold Ruzicka and Oskar Jeger, Zurich, and Duilio Arigoni, Lugano-Paradiso, Switzerland, assignors to Ciba Corporation, a corporation of Delaware
No Drawing. Filed Dec. 3, 1958, Ser. No. 777,860
Claims priority, application Switzerland, Dec. 11, 1957, 53,623; Apr. 24, 1958, 58,731; May 9, 1958, 59,301
19 Claims. (Cl. 260—239.5)

This invention is based on the observation that new cyclic tertiary aminosteroid compounds can be prepared in a simple manner by treating secondary halogen-aminosteroids with concentrated mineral acids. According to the position of the amino group this process yields new heterocyclic steroid compounds containing the nitrogen atom in a 4-, 5-, 6-, or 7-membered ring. The following formula scheme illustrates the manner in which ring closure in a secondary 20-halogen-aminosteroid is brought about by the reaction according to the present process:

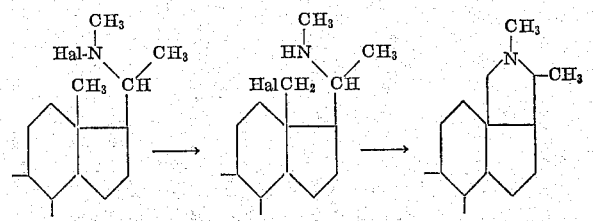

As will be seen the reaction of a secondary 20-halogen-aminosteroid according to the present process yields first a 20-amino-steroid substituted by halogen in the 18-position, and then by splitting off hydrogen halide a steroid of conessine-like structure; these steroids have not been synthesized before and they can be used for preparing compounds with a pharmacological action similar to that of conessine. Moreover, the new steroids with the cyclic imino structure shown above are suitable as intermediates for the synthesis of other valuable steroids with pharmacological and therapeutic properties, such as the important class of the 18-oxygenated pregnane compounds, to which belong, inter alia, 18-hydroxycorticosterone and the potent mineralocorticoid aldosterone. The conversion of said imino compound into a 18-oxygenated pregnane compounds may be illustrated by the following diagram:

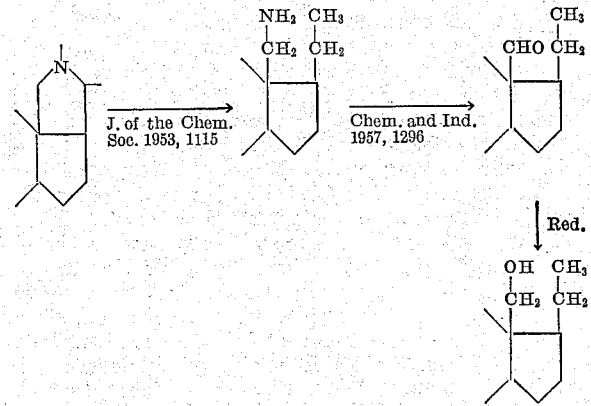

For bringing about the ring closure according to the present process the secondary halogen-aminosteroid is dissolved in concentrated mineral acid, such as hydrochloric, phosphoric and more especially in concentrated sulfuric acid of, for example, about 85% strength. Acids, such as trichloroacetic acid may also be used, it is also advisable to utilize an inert solvent for the condensation, particularly a concentrated lower fatty acid, such as glacial acetic acid or propionic acid. By carrying out the reaction at about 0° to 25° C., the optimum yield is obtained after about 24 hours, but when a higher temperature, for example a temperature ranging from 70° to 100° C., is used, the reaction takes less time, for example ½ hour. The reaction time can be shortened without raising the temperature by irradiation of the reaction solution, more especially with ultraviolet light from a natural or artificial source. Furthermore, the yield of cyclisation product can be considerably increased by using a metal salt catalyst, above all a sulfate or chloride of iron, manganese, cobalt, nickel or copper. The reaction products are worked up in the usual manner.

Under suitable conditions the 18-halogen steroids of the above partial formula can be isolated, for instance when the reaction mixture is adjusted to about pH 7–8 and extracted with an organic solvent. The products thus isolated may then be converted into the cyclic amines of the conessine type by treatment with alkaline agent, e.g. an alkali metal lower alkanoate, hydrogen halide being split off.

Compounds suitable as starting materials in the present process are secondary halogen-aminosteroids, more especially chloro- and bromo-aminosteroids derived from the known steroid series, such as the cholestane, ergostane, sitostane, spirostane, cholane, bisnorcholane, etiocholane, pregnane, androstane or oestrane series, or from tetracyclic triterpenes (4:4:14-trimethyl steroids), for example from lanosterine, which contain the secondary halogen-amino group in one of the positions 1, 2, 3, 4, 6, 7, 11, 12, 15, 16, 17, 18, 20, 21, 22 or 24. Apart from the secondary halogen-amino group the starting materials may further contain any other substituent such as free or functionally converted hydroxyl or oxo groups, halogen atoms or alkyl such as methyl groups. These substituents are present in one or several of the afore-mentioned positions, more especially in positions 2, 3, 4, 6, 9, 11, 12, 17 or 21. The starting materials may be saturated in the ring system or contain double bonds, for example in one or several of positions 1, 4, 5, 9(11), 11, 14 or 16. The term "functionally converted hydroxyl or oxo groups" designates esterified or etherified hydroxyl groups or ketalized or enolized oxo groups or oximes, hydrazones or semicarbazones.

The secondary halogen-amines used as starting materials are obtained in the usual manner from appropriate secondary aminosteroids, for example by reaction with hypohalous acids such as hypochlorous, hypobromous or hypoiodous acid, such as are obtained from chlorine, bromine or iodine and an alkali metal hydroxide (e.g. sodium, potassium, lithium etc. hydroxide) or from N-halogen-amides or -imides, for example N-chloro-, N-bromo-, N-iodo-imide or -amide. The secondary aminosteroids from which the halogen-amines are derived can be prepared by known methods, for example by oximation of steroid ketones and subsequent reduction of the oximes, for example with the aid of catalytically activated hydrogen, e.g. by hydrogenation in glacial acetic acid in the presence of a suitable noble metal, such as a platinum catalyst, or of complex light-metal hydrides, such as lithium aluminum hydride. The resulting primary amino compounds can be converted in known manner into the corresponding secondary amine, for example by acylation, particularly with a lower fatty acid or a derivative thereof such as formylation, and reduction of the acyl radical, such as reduction of a formyl radical to the methyl group.

The products of the present process that contain free hydroxyl and/or oxo groups can be converted in the usual manner into their functional derivatives such as esters, ethers, enolesters, enol-ethers, acetals, their corresponding thio-derivatives, for example thio-ethers, thio-acetals and esters of thio-acids, as well as hydrazones and oximes. The acid residues of the esters and enol-esters are those of saturated or unsaturated aliphatic (e.g. fatty acids, especially lower fatty acids, maleic acid, succinic acid, malonic acid, adipic acid etc), cycloaliphatic (e.g. cyclopentane carboxylic acid, cyclohexane carboxylic acid, cyclohexene carboxylic acid, etc.), aromatic (e.g. benzoic acid, 2-methyl benzoic acid, salicyclic acid, phthalic acid, etc.), or heterocyclic (e.g. nicotinic acid, piperidine carboxylic acid, etc.) mono- or di-carboxylic acids, of sulfonic acids, or of phosphoric, sulfuric or hydrohalic acids. The radicals of the ethers, enol-ethers, acetals or corresponding thio-derivatives may belong to the aliphatic, aromatic or heterocyclic series; such radicals are, for example, alkyl (especially lower alkyl) or alkylene (especially lower alkylene) but preferably aralkyl radicals (especially aryl lower alkyl radicals), such as benzyl-, di- or triphenylmethyl- groups, tetrahydropyranyloxy groups, or sugar (especially mono and disaccharides) radicals, such as those of glucose, galacetose or maltose.

The following examples illustrate the invention:

*Example 1*

786 mg. of 20α-N:N-chloro-methylamino-3-oxo-allopregnane are dissolved in 50 cc. of a 5:1 mixture of glacial acetic acid and sulfuric acid. The initially pale-brown solution darkens gradually and finally turns dark green. The solution is stirred for 3½ hours at room temperature (accompanied by continuous slight evolution of gas), then slowly heated to 75° C. and finally maintained for 10 minutes at 80° C. When no more gas is being evolved, the reaction solution is allowed to cool and after a total reaction time of 6 hours poured into ice-cold sodium hydroxide solution of 10% strength. Extraction of the solution thus obtained with ether gives a quantitative yield of a brown resinous oil from which 678 mg. of a brown, viscous oil of alkaline reaction can be isolated by extraction with 2 N-sulfuric acid. 624 mg. of this oil are extracted with benzene and filtered through a column of alumina, the benzene is evaporated, and 431 mg. of a purified oil are obtained; it is dissolved in 5 cc. of pyridine, mixed with 15 cc. of aceticanhydride and kept overnight. The solution is then heated for 1 hour in a water bath, and the pyridine and aceticanhydride are removed in vacuo while spraying in benzene. The acetylation mixture is taken up in benzene and washed twice with water. The free amine is then extracted with 2 N-sulfuric acid and tartaric acid solution of 10% strength. (Evaporation of the benzolic solution yields 20α-[N-acetyl-N-methyl]-amino-3-oxo-allopregnane melting at 214° C.). The acid extract is rendered alkaline with concentrated ammonia while being cooled with ice, and the free amine is taken up in benzene. By washing the extract solution until neutral, drying it and evaporating the solvent, 30 mg. of 18:20-imino-N-methyl-3-oxo-allopregnane are obtained which melts at 136–137° C. after having been crystallized from methanol/water; pK: 8.09. The yield of tertiary amine rises to about ten times its value when the ring closure is carried out in the presence of a catalytic amount of ferrous sulfate.

The chloramine used as starting material can be obtained, for example, thus:

4.816 grams of 3β-acetoxy-20-keto-allopregnane, 5 grams of hydroxylamine hydrochloride and 3 cc. of pyridine are dissolved in 150 cc. of ethanol and refluxed for 5 hours. The condenser is removed and the solution is concentrated to a volume of about 100 cc. While continuing the distillation, ethanol/water is added dropwise until crystallization sets in. The solution is allowed to cool, suction-filtered, and the white crystalline residue washed with water containing methanol. After drying in vacuo at 100° C., 4.782 grams of 3β-acetoxy-20-keto-allopregnane-oxime, melting at 198° C., are obtained.

250 mg. of platinum oxide are pre-hydrogenated in 10 cc. of glacial acetic acid, and a solution of 1.56 gram of the above oxime in 50 cc. of glacial acetic acid is added. When the absorption of hydrogen ceases, the catalyst is filtered off and the filtrate evaporated in vacuo at 30–35° C. Recrystallization from benzene/hexane yields 3β-acetoxy-20α-amino-allopregnane acetate melting at 184–184.5° C.

2.03 grams of the amine acetate are suspended in a small amount of benzene and while being cooled treated with an excess of concentrated ammonia. The free 20α-amino-3β-acetoxy-allopregnane is taken up in benzene. By washing the extract solution until neutral, drying it and evaporating the benzene, 1.71 grams of amorphous amine are obtained. 1.53 grams of finely ground crude amine are heated with 30 cc. of ethyl formate in a bomb tube for 5 hours at 85° C. The pale-yellow, clear solution is evaporated to dryness in vacuo, and the crude formyl compound is taken up in benzene. To remove any non-formylated amine, the benzolic solution is extracted three times with 2 N-sulfuric acid. The benzolic solution is washed until neutral, the solvent is expelled, and 1.52 grams of 20α-formyl-amino-3β-acetoxy-allopregnane are obtained which, after crystallization from acetone/hexane, melts at 184° C.

A solution of 1.68 grams of the formyl compound in 80 cc. of absolute benzene is added dropwise to a suspension of 2.5 grams of lithium aluminum hydride in 150 cc. of absolute ether. Rinsing with 20 cc. of absolute benzene is performed and a trace of aluminum chloride is added. After a reaction time of 48 hours the reaction solution is cooled with ice and decomposed with slightly more than the theoretical amount of water. The granular precipitate is filtered off, finely triturated and extracted with benzene in a Soxhlet apparatus. The benzolic extract and the filtrate are combined and the amine is extracted with 2 N-sulfuric acid. While being cooled with ice, the acid extract is treated with concentrated ammonia and the free amine extracted with benzene. Crystallization from methanol or from methanol/acetone yields 20α-N-methylamino-3β-hydroxy-allopregnane melting at 210–210.5° C.; pK: 9.21/9.17.

The cooled solution (cooling bath at 6 to 8° C.) of 857 mg. of the above hydroxymethylamine in 75 cc. of glacial acetic acid is treated dropwise with a chromic acid solution (350 mg. of $CrO_3$ in 20 cc. of glacial acetic acid and 5 cc. of water) while being vigorously vibrated. When all chromic acid has been added, the cooling bath is removed and the whole is kept for 16 hours at room temperature. While cooling with ice, the excess chromic acid is destroyed with methanol and the reaction mixture diluted with water. After rendering the mixture alkaline with concentrated ammonia, it is worked up with ether, and from the ethereal extract the amine is extracted with 2 N-sulfuric acid and tartaric acid solution of 10% strength. The acid extract is treated with concentrated ammonia while being cooled with ice. Extraction with ether yields 829 mg. of 20α-N-methylamino-3-keto-allopregnane; pK: 9.21/9.20. The corresponding N-acetate melts at 216–217° C. after having been recrystallized from methanol/water and acetone/methanol.

327 mg. of the above keto-amine are dissolved in 60 cc. of absolute ether and while being stirred treated with 160 mg. of N-chlorosuccinimide of 86% strength. After 10 minutes the solution gives a neutral reaction. The ethereal solution is evaporated in vacuo until a white precipitate (succinimide) is obtained; it is poured into water and worked up with ether. Any unreacted amine is removed with tartaric acid solution of 10% strength. The reaction mixture is washed until neutral, dried, and evaporated in vacuo to yield 364 mg of white semi-crystalline 20α - N:N - chloro - methylamino - 3 - oxo-allopregnane which has no defined melting point. Titration of the crude product reveals an N-chloramine content of 94.5%.

Example 2

654 mg. of Δ⁴-20-N:N-chloro-methylamino-3-oxo-21-nor-pregnene are dissolved in 36 cc. of sulfuric acid of 86% strength and stirred for 1 hour at 30° C. and for 3 hours at 40° C. The olive-green reaction solution is poured on to ice, diluted with water, and extracted with ether. The combined ethereal extracts are washed until neutral, dried and evaporated to yield 16 mg. of a brown oil. The acid solution is cooled with ice, rendered alkaline with concentrated ammonia and extracted with ether to yield 403 mg. of a dark brown oil which crystallizes on addition of ether.

This oil is then acetylated with aceticanhydride and pyridine as described in Example 1. The solvent is removed in vacuo, and the oil is dissolved in a few drops of methanol and taken up in ether. The non-acetylated tertiary amine is extracted with dilute sulfuric acid. The combined acid extracts are rendered alkaline with potassium hydroxide, and the free amine is extracted therefrom with ether while cooling with ice. Yield: 165 mg. of an oil which gives a very weakly positive Beilstein reaction. The brown oil is taken up in a 2:3 mixture of petroleum ether and benzene and chromatographed over 2.5 grams of alumina. Elutriation of the first three fractions with petroleum ether/benzene (2:3) yields 109 mg. of a colorless oil which undergoes partial crystallization upon addition of ether.

After having been recrystallized from acetone and sublimed in a high vacuum, Δ⁴-18:20-imino-N-methyl-3-oxo-21-nor-pregnene melts at 87.5–90.5° C. Ultraviolet spectrum: maximum $\lambda_{max}$ 242 m$\mu$, log $\epsilon$=4.182; pK: 8.09.

The chloramine used as starting material can be prepared, for example, thus:

5 grams of methylamine are slowly introduced into a solution of Δ⁵-3β-acetoxy-etiocholenic acid chloride (prepared in the usual manner from 1.78 grams of Δ⁵-3β-acetoxy-etiocholenic acid) in 100 cc. of absolute ether, a white precipitate being obtained. The reaction solution is then poured into water and the acid amide taken up in a large quantity of ether containing methylene chloride. The ethereal solution is extracted with 2 N-sulfuric acid and saturated potassium bicarbonate solution, washed with water and evaporated. After recrystallization from a mixture of methylene chloride and hexane Δ⁵-3β-acetoxy-etio-cholenic acid-N-methylamide melts at 211° C.

A solution of 1.26 grams of the above acid amide in 300 cc. of a 1:1 mixture of benzene and ether is added dropwise with vibration into a suspension of 2.4 grams of lithium aluminum hydride in 150 cc. of ether and 50 cc. of benzene. The mixture is refluxed for 14 hours and the excess lithium aluminum hydride is then destroyed with 10 cc. of water. 200 cc. of potassium hydroxide solution of 35% strength are added, and the mixture is extracted with ether. The ethereal solution is washed with water until neutral, and the methylamine derivative formed is extracted with 2N-sulfuric acid. The acid extract is rendered alkaline while being cooled with ice, and the free amine is taken up in ether. The ethereal solution is washed until neutral, dried and evaporated to yield 985 mg. of a crystalline crude product melting at 173–174° C. Recrystallization from a mixture of methylene chloride and acetone yields 855 mg. of Δ⁵-20-methylamino-3β-hydroxy-21-nor-pregnene melting at 173° C.; pK: 9.48.

From a solution of 1.6 grams of potassium in 25 cc. of tertiary butanol and 20 cc. of butanol sufficient solvent is distilled off to achieve a boiling point of about 79° C., and a suspension of 930 mg. of the above hydroxy-N-methylamine in 5 cc. of agsolute benzene, and 5 grams of benzophenone in 5 cc. of absolute benzene are added. The mixture is refluxed for 80 minutes, during which time the color changes from yellow to dark brown. The reaction solution is allowed to cool, treated with 100 cc. of benzene, and poured on to ice. The amine is extracted from the benzolic extract with 2 N-sulfuric acid. The combined extracts are rendered alkaline while being cooled with ice. The yellowish aqueous solution is extracted twice with ether and once with ethyl acetate. The extracts are washed until neutral, dried and evaporated to yield 815 mg. of a viscous yellowish brown oil. Ultraviolet spectrum of the crude product: $\lambda_{max}$ 242 m$\mu$, log $\epsilon$=4.199. The oil is dissolved in 50 cc. of a 2:3 mixture of petroleum ether and benzene and chromatographed over 10 times the amount of alumina. Elutriation with 2:3 and 1:2 mixtures of petroleum ether and benzene yields 561 mg. of Δ⁴-20-methylamino-3-oxo-21-nor-pregnene which, after having been recrystallized once from ether/petroleum ether, melts at 108–110° C. Ultraviolet maximum $\lambda_{mxa}$ 242 m$\mu$, log $\epsilon$=4.186; pK: 9.11.

A solution of 437 mg. of the above keto-amine in 120 cc. of absolute ether is cooled to −5° C. and then mixed with 216 mg. of N-chlorosuccinimide of 86% strength. The solution, which gives a neutral reaction, is stirred for 2 hours and then evaporated to dryness in vacuo at room temperature. The resulting crude Δ⁴-20-N:N-chloro-methylamino-3-oxo-21-nor-pregnene (654 mg.) can be subjected to ring closure according to the present invention without requiring purification.

Example 3

550 mg. of 20α-N:N-chloro-methylamino-allopregnane are mixed at 20° C. with 15 cc. of a mixture of sulfuric acid and glacial acetic acid (20 grams of sulfuric acid of 96% strength and 100 cc. of glacial acetic acid) and 50 mg. of ferrous sulfate. Since N-chloramine is very sparingly soluble, another 6 grams of concentrated sulfuric acid are added dropwise to bring about complete dissolution. After 7 hours the whole is poured on to 50 grams of ice and rendered alkaline with concentrated potassium hydroxide solution. The turbid solution is kept overnight, separated into its basic and neutral constituents, and yields 427 mg. of a pale-brown oil (basic extract) which crystallizes spontaneously as well as 28 mg. of an oily neutral body. The amine (427 mg.) is dissolved in 15 cc. of petroleum ether and chromatographed over 13 grams of alumina. Elutriation of the first two fractions with petroleum ether yields 296 mg. of white crystals melting at 106° C. After one recrystallization from petroleum ether/acetone 276 mg. of 18:20-imino-N-methyl-allopregnane melting at 107° C. are obtained. Optical rotation $[\alpha]_D^{19}$=+61°; pK: 8.28.

18:20-imino-N-methyl-allopregnane can be combined with the natural product conessine in the following manner:

A solution of 1.06 gram of dihydro-iso-conessimine in 100 cc. of absolute ether is treated with 465 mg. of N-chloro-succinimide of 85% strength. The solution is stirred for 2 hours at room temperature. Working up yields 934 mg. of a colorless oil which crystallizes from methanol. After having been recrystallized three times from ether containing a trace of methanol 620 mg. of chloramine of the formula

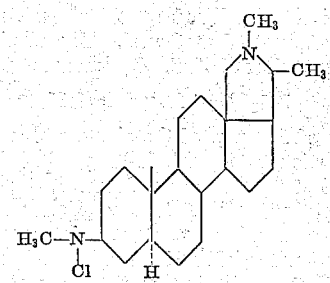

are obtained in the form of fine needles. According to its iodometric titration the product contains 94.1% of N-chloramine.

The crystalline N-chloramine (530 mg.) is added to a solution of 250 mg. of sodium in 20 cc. of absolute methanol, and this solution is refluxed for 45 minutes with exclusion of moisture. The methanol is removed in vacuo and the yellow residue hydrolysed overnight at 20° C. with 60 cc. of N-sulfuric acid. The solution is then heated for 1 hour at 95° C. Working up yields, in addition to 62 mg. of a neutral body, 364 mg. of 18:20-imino-N-methyl-3-oxo-allopregnane (infra-red sprectrum: band at 1705 cm.$^{-1}$). 335 mg. of the amine are taken up in 7.5 cc. of a 1:2 mixture of petroleum ether and benzene and chromatographed over 4 grams of alumina. Elutriation of the first three fractions with a 10:1 mixture of petroleum ether and benzene yields 207 mg. of a colorless oil (M.P. 143° C.) which crystallizes spontaneously. After having been recrystallized from ethanol/water, acetone/water and acetone, 18:20-imino-N-methyl-3-oxo-allopregnane melts at 146° C. Optical rotation $$[\alpha]_D^{20} = 80°; pK = 8.26$$

The above 3-keto-amine (120 mg.) is dissolved in 1.2 cc. of ethanol and 3 cc. of diethylene glycol, treated with 1 gram of hydrazine hydrate and refluxed for 2 hours. 0.2 gram of potassium hydroxide is added and the mixture refluxed for 10 minutes, the condenser is removed and the whole is distilled until the temperature has risen to 190° C., and then refluxed for 2 hours (temperature of the solution: 200–210° C.). The cooled reaction solution is poured into water and the amine taken up in ether. The hydrazine is washed out with a large amount of water, and the amine is extracted with tartaric acid solution of 10% strength. The resulting crystalline amine (108 mg.) is dissolved in 3 cc. of petroleum ether and filtered through 3.5 grams of alumina. Elutriation of the first fractions with petroleum ether yields 92 mg. of a colorless oil which crystallizes from acetone; M.P. 105–106° C.; optical rotation $[\alpha]_D^{20} = +63°$; pK=8.28. A mixed melting point test with the product of ring closure thus obtained shows no melting point depression. The infrared spectra of the two products are identical.

The starting material used in the above example can be made, for instance, thus:

A solution of 1.5 grams of 20α-N-methylamino-3-oxo-allopregnane in 12 cc. of ethanol and 30 cc. of diethylene glycol is treated with 10 grams of hydrazine hydrate and the whole is refluxed for 2 hours, treated with 2 grams of potassium hydroxide and refluxed for another 10 minutes. The condenser is then removed and the reaction mixture distilled until its temperature has risen to 190° C. and then refluxed for 2 hours (temperature of the solution 200–210° C.). The cooled reaction solution is poured into water and the amine taken up in ether. The hydrazine is washed out with a large amount of water and the amine extracted with tartaric acid solution of 10% strength. The ethereal solution is washed until neutral and dried to yield 13 mg. of an oily neutral body. The acid extract is rendered alkaline with concentrated potassium hydroxide solution while being cooled with ice. Extraction with ether yields 1.42 grams of the yellowish 20α-N-methylamino-allopregnane which crystallizes spontaneously and melts at 92.5° C. For further working up the product is recrystallized once from acetone containing a small amount of methanol. The product purified in this manner melts at 96° C. Optical rotation $$[\alpha]_D^{20} = +32°; pK = 9.32$$

A solution of 500 mg. of the above amine in 75 cc. of absolute ether is treated with 250 mg. of N-chlorosuccinimide of 98% strength. After 15 minutes the solution reacts only slightly alkaline. The solution is stirred for 2 hours at room temperature, poured into water and extracted with ether to yield 561 mg. of crystalline 20α-N:N-chloro-methylamino-allopregnane melting at 140° C.

*Example 4*

500 mg. of the 20α-N:N-chloro-methylamino-allopregnane described in Example 3, in a mixture of 8 grams of sulfuric acid of 96% strength and 15 cc. of glacial acetic acid, are irradiated in a quartz vessel at room temperature for 7 hours with ultraviolet light. The reaction mixture is then cautiously neutralized to pH=7 to 8 with dilute sodium hydroxide solution while being cooled with ice and extracted with ethyl acetate to yield 490 mg. of 18-chloro-20α-methylamino-allopregnane which melts at 110-120° C. with decomposition after crystallization from a mixture of ether and pentane; pK=9.41. When a solution of barium chloride instead of caustic soda solution is added to the above reaction solution, the barium sulfate is suctioned off and the filtrate evaporated in vacuo, the sulfate of 18-chloro-20α-methylamino-allopregnane is obtained. By treatment with sodium hydroxide solution it can be converted into the free base melting at 110–120° C.

For bringing about ring closure, the resulting 18-chloro-20α-methylamino-allopregnane is kept overnight at 20° C. in 100 cc. of a sodium ethylate solution of 10% strength, and the tertiary base is then isolated as described in Example 3. The resulting 18:20-imino-N-methyl-allopregnane melts at 106-107° C. and is identical with the compound described in Example 3.

Treatment of the 18-chloro-20α-methylamino-allopregnane described above with sodium nitrite in hydrochloric acid solution yields 18-chloro-20α-N-nitroso-N-methyl-allopregnane.

*Example 5*

600 mg. of 20α-N:N-chloro-methylamino-3β-acetoxy-allopregnane (melting at 120–140° C. with decomposition) are reacted at 20° C. with 15 cc. of a mixture of sulfuric acid and glacial acetic acid (20 grams of sulfuric acid of 96% strength and 100 cc. of glacial acetic acid) and 50 mg. of ferrous sulfate as described in Example 3. After a reaction time of 7 hours the mixture is poured on to 50 grams of ice and rendered alkaline with concentrated potassium hydroxide solution, separated into neutral and basic constituents, and the resulting amine is chromatographed over 15 grams of alumina. Elutriation with petroleum ether and mixtures of petroleum ether and benzene yields 18:20-imino-N-methyl-3β-acetoxy-allopregnane which melts at 166–167° C. after having been crystallized from a mixture of ethyl acetate and hexane; pK=8.22.

20α-N:N-chloro-methylamino-3β-acetoxy-allopregnane, used as starting material, can be prepared thus:

1 gram of 20α-N-methylamino-3β-hydroxy-allopregnane and 2 grams of para-toluenesulfonic acid are boiled overnight in 100 cc. of glacial acetic acid. The reaction mixture is poured into water, neutralized with ammonia and the amine extracted with benzene. The resulting 20α-N-methylamino-3β-acetoxy-allopregnane melts at 159–160° C. after crystallization from methanol/acetone; pK=9.4; bands in the infra-red spectrum at 1725 and 1260 cm.$^{-1}$. Conversion into 20α-N:N-chloro-methylamino-3β-acetoxy-allopregnane (melting at 120–140° C. with decomposition) with N-chlorosuccinimide is performed as in Example 1.

Working up of Δ$^5$-20α-N:N-chloro-methylamino-3β-acetoxy-pregnane as described in Example 3 yields Δ$^5$-18:20-imino-N-methyl-3β-acetoxy-pregnene. Δ$^5$-20α-N:N-chloro-methylamino-3β-acetoxy-pregnene, used as starting material, can be prepared from Δ$^5$-3β-acetoxy-pregnene-20-one in the manner described in the preceding examples.

What is claimed is:

1. Process for the manufacture of 18:20-imino-N-lower alkyl steroids selected from the group consisting of pregnanes and 21-nor-pregnanes, wherein a 20-N-halogeno-N-lower alkylamino-steroid selected from the group consisting of pregnanes and 21-nor-pregnanes is reacted with a strong acid and any resulting 18-halogeno-20-lower alkylamino-compound is treated with alkaline agent.

2. Process according to claim 1, wherein the strong acid used is concentrated sulfuric acid.

3. Process according to claim 1, wherein the strong acid used is a mixture of concentrated sulfuric acid and a member selected from the group consisting of glacial acetic acid and propionic acid.

4. Process according to claim 1, wherein the reaction with a strong acid is performed in the presence of a metal salt as catalyst, said catalyst being a member selected from the group consisting of sulfates and chlorides of iron, manganese, cobalt, nickel and copper.

5. Process according to claim 1, wherein the reaction with a strong acid is performed while the reactants are irradiated with ultraviolet light.

6. Process according to claim 1, wherein 20α-N,N-chloro-methylamino-3β-acetoxy-allopregnane is used as starting material.

7. Process according to claim 1, wherein 20α-N,N-chloro-methylamino-3-oxo-allopregnane is used as starting material.

8. Process according to claim 1, wherein 20α-N,N-chloro-methylamino-allopregnane is used as starting material.

9. Process according to claim 1, wherein Δ⁴-20-N,N-chloro - methylamino-3-oxo-21-nor-pregnene is used as starting material.

10. Process according to claim 1, wherein an 18-halogeno-20-lower alkylamino-steroid selected from the group consisting of pregnanes and 21-nor-pregnanes formed as intermediate product is isolated.

11. Process according to claim 1, wherein the alkaline agent used is an alkali metal lower alkanoate.

12. A compound of the formula:

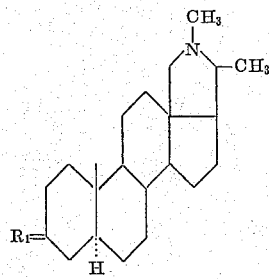

in which $R_1$ represents a member selected from the group consisting of oxo, hydrogen and hydroxy and hydrogen and acyloxy derived from lower fatty acids.

13. 18,20-imino-N-methyl-3-oxo-allopregnane.

14. 18,20-imino-N-methyl-3β-acetoxy-allopregnane.

15. A member selected from the group consisting of a compound having the formula:

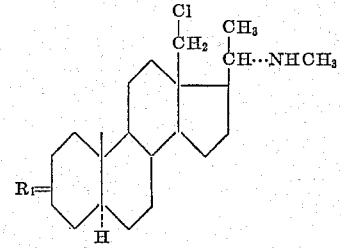

in which $R_1$ represents a member selected from the group consisting of oxo, hydrogen and hydroxy and hydrogen and acyloxy derived from lower fatty acids, the 4-dehydro derivatives of the 3-oxo-compounds and the 5-dehydro derivatives of the 3-hydroxy- and 3-acyloxy-compounds.

16. 18-chloro-20α-methylamino-allopregnane.

17. 18-chloro-20α-methylamino-3-oxo-allopregnane.

18. 18 - chloro - 20α-methylamino-3β-acetoxy-allopregnane.

19. Δ⁵ - 18 - chloro-20α-methylamino-3β-acetoxypregnene.

References Cited by the Examiner

UNITED STATES PATENTS

| | | | |
|---|---|---|---|
| 2,582,258 | 1/52 | Julian et al. | 260—397.3 |
| 2,740,781 | 4/56 | Mueller | 260—239.5 |
| 3,063,987 | 11/62 | Pappo | 260—239.5 |

OTHER REFERENCES

Buchschacher et al.: J.A.C.S. (June 5, 1958), vol. 80, pages 2905–6.

Haworth et al.: J. Chem. Soc. (1957), pages 4973–4983.

LEWIS GOTTS, *Primary Examiner.*

B. E. LANHAM, LESLIE H. GASTON, *Examiners.*